United States Patent Office 2,708,361
Patented May 17, 1955

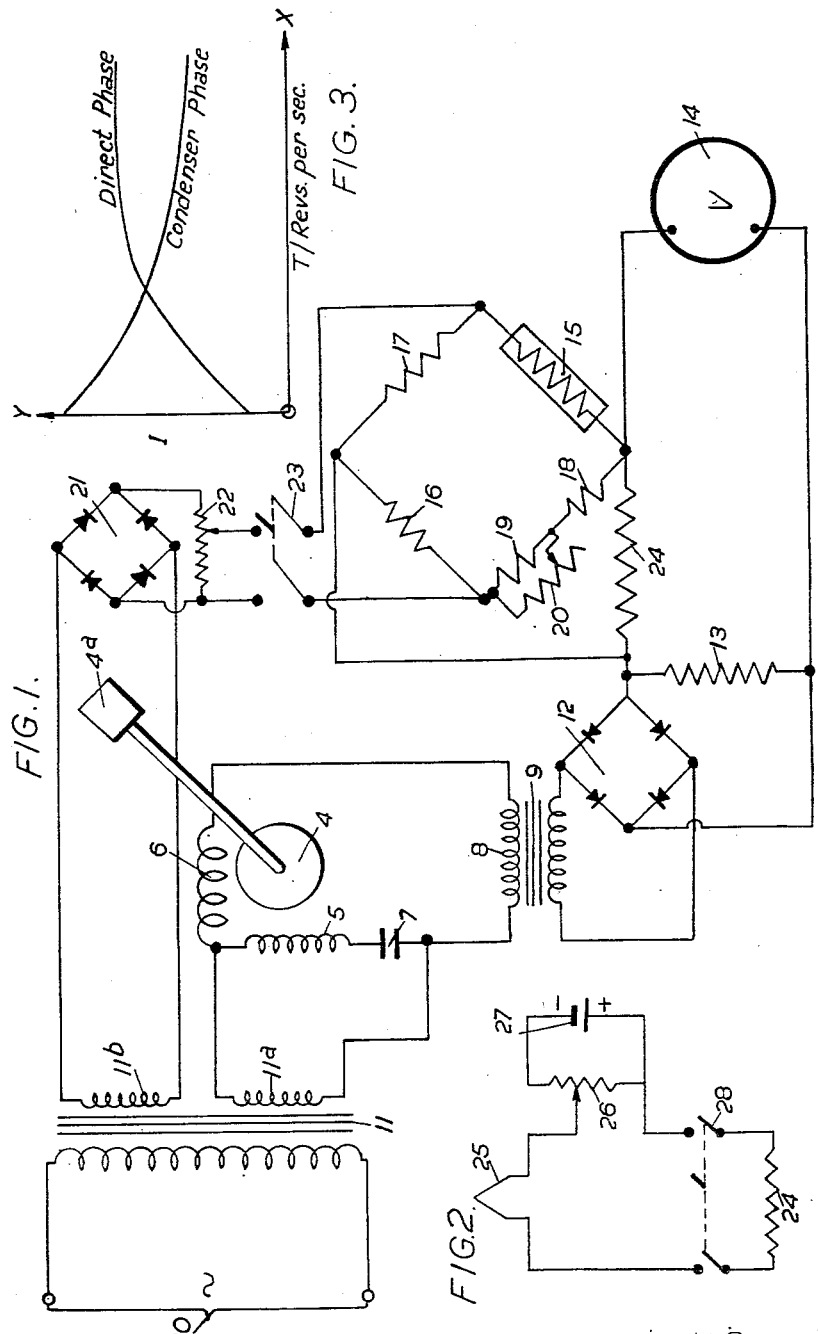

2,708,361

ELECTRICAL VISCOMETERS

Archibald Raymond Boyle, Glasgow, and Thomas Byrne, Clydebank, Scotland, assignors to Dobbie McInnes Limited, Glasgow, Scotland, Great Britain Application May 22, 1951, Serial No. 227,548

7 Claims. (Cl. 73—59)

This invention relates to electrical viscometers, in which the resistance to movement (usually rotation) of a body in the liquid under test is measured electrically. The term "liquid" is intended to include not only liquids but semi-liquids and like fluent materials. Such viscometers have been proposed hitherto in which the indicated viscosity is a measure of the actual viscosity of the liquid under test at the temperature it is at the moment. This ambient temperature may vary frequently and the actual viscosity of the liquid varies with variation in temperature.

When measuring the viscosity of liquids in a vat, pipeline or other container, it is usually difficult to maintain a temperature of sufficient accuracy to meet the requirements of a directly indicating viscometer, when as is often the case, it is desired to know the viscosity of the liquid as it would be at a certain predetermined or standard temperature. Changes of one-tenth degree centigrade cause appreciable errors in the viscosity indication.

In accordance with the invention, we provide a viscometer in which the viscosity of a liquid under test is measured by an electric current (hereinafter called the "primary current"), and comprising a device which feeds to said primary current a secondary current which is a function of the deviation of the measured viscosity (i. e., the primary current) from the viscosity of the liquid as it would be at a standard temperature, thereby to compensate the measurement for variations in the temperature of the liquid from the standard temperature.

The secondary current may be either additive to or subtractive from the primary current in accordance with the temperature, for the time being, of the liquid actually under test.

The viscometer may further comprise a drag member adapted to be rotated in the liquid under test by means of an electric motor, the primary current being a function of the electrical current or power input to the motor. The electric motor comprises a two-phase motor adapted to be fed from a single phase supply, and a reactance is connected in one phase of said motor of a value which causes resonance to occcur in that phase at approximately synchronous motor speed, the current in the other phase providing said primary current. A resistance bridge or thermo-couple may be used to provide an out of balance compensating current or voltage.

We will now describe embodiments of the invention by way of example with reference to the accompanying drawing wherein:

Fig. 1 shows the electrical circuit diagram of a viscometer whereof the compensating voltage is obtained by means of a resistance bridge network;

Fig. 2 shows the electrical circuit diagram of a thermocouple and opposing battery which are in balance at the standard temperature and may replace the compensating resistance bridge network for supplying the compensating voltage; and Fig. 3 shows curves illustrating the functioning of the circuit shown in Fig. 1.

The motor driving the electric viscometer comprises a rotor 4 mechanically coupled to a drag member 4a with stator windings 5 and 6 arranged in two phases 90° electrical apart, the winding 5 having a condenser 7 in series therewith (this constituting the "condenser phase") and winding 6 having the primary winding 8 of a current transformer 9 in series therewith (constituting the "direct phase"). These two phases are fed from a single phase supply 10, through a mains transformer 11 and secondary winding 11a.

It has been found that in a driving motor of this nature the alternating current flowing in the primary winding 8 is substantially proportional to the log of the viscosity of the liquid under test at the temperature of test. The output current of said current transformer 9 (or "primary current") is fed through rectifier 12 to a resistance 13 in the indicating circuit which applies a voltage to the milli-voltmeter 14. A temperature-compensating resistance element 15 is immersed in the liquid under test near to the drag member 4a, and this resistance 15 is connected as one arm of a direct current Wheatstone resistance bridge arrangement wherein 16, 17, 18 and 19 are fixed resistances and 20 is a variable resistance for selecting the desired standard temperature corresponding to which the viscosities are to be indicated, i. e., resistance 20 is set to give the null position of the bridge with the resistance element 15 at the desired standard temperature.

The bridge is energised from a secondary winding 11b of said mains transformer 11 through rectifier 21 and a potentiometer resistance 22 which varies the input to the bridge. A switch 23 is provided in the bridge input leads.

The output or "secondary current" from the bridge is fed to a resistance 24 in said indicating circuit which applies a temperature compensating voltage to said milli-voltmeter 14 in series with the first voltage at 13.

The compensating voltage is additive to or subtractive from the first voltage in accordance with the temperature of the liquid, i. e., whether it is above or below the standard temperature. Thus a temperature-compensated indication is given at the milli-voltmeter 14 which converts the actual viscosity reading to that at which it would be at a predetermined or standard temperature.

By breaking the bridge input circuit by means of switch 23, an indication may be given at the indicating instrument of the actual (that is the non-compensated) viscosity of the liquid under test.

The current in the direct phase of the motor arrangement shown in the drawing has been found to be approximately proportional to the log. of the change of the viscosity of the liquid under test. Moreover it has been ascertained that the value of log. of viscosity of the liquid changes approximately in proportion to the change in temperature of the liquid; thus the current in the direct phase must vary in proportion with the change of temperature.

Now in a resistance bridge as shown the change in the out of balance current at any temperature due to change in temperature of arm 15 is approximately proportional to such change of temperature within the working range involved and irrespective of the zero out of balance setting; this out of balance current (the secondary current) varies however in the opposite sense to that of the primary, so that it can be used to compensate the latter for temperature variation.

The viscosity temperature coefficient of a liquid can be defined as the percentage variation or rate of change of viscosity with variation of temperature. With a liquid having a low or a high temperature coefficient the secondary or compensating current must be reduced or boosted accordingly, as the out of balance current from the resistance bridge of itself allows only for variation in temperature and not of temperature coefficient. By altering the setting of potentiometer 22 on a scale, the input to the bridge may be reduced or boosted in accordance with the temperature coefficient of the particular liquid under test, which is normally known. This reduction or boosting is reflected in the bridge out of balance current.

The temperature coefficient of a liquid may be ascertained by switching off the compensating circuit (the secondary current) and noting the change in indicated viscosity at V (14). Knowing the temperature difference from the standard temperature, the temperature coefficient is then obtained.

In use of the viscometer, the drag member 4a and temperature-influenced resistance 15 are immersed in the liquid under test and the drive motor is energised.

The indicating pointer of the potentiometer 22 is moved to correspond with the temperature coefficient of the viscosity of the type of liquid under test, the indicating pointer of the variable resistance 20 is moved to correspond with the desired standard temperature and the switch 23 is closed.

A reading may then be taken of the viscosity of the liquid under test at the indicated standard temperature.

It is explained that referring to the rotational movement of a body through a liquid, by definition the viscosity of the liquid is directly proportional to the shear force of the body divided by the rate of shear. The shear force multiplied by the torque arm is equivalent to the actual torque value, while the rate of shear may be stated in terms of revolutions per second of the body (revs. per sec.). Now in any electric motor the current input is a function of the ratio of torque divided by speed of rotation, or that ratio is equivalent to the viscosity multiplied by a constant.

From this it follows that the viscosity of the liquid is a function of the input current. In the present arrangement a function of the current in the direct phase 6, 8 is measured.

The synchronous speed of the motor is determined by the supply frequency and the number of poles on the motor. Knowing this in advance, the capacity of the condenser 7 is selected to give the circuit a natural periodicity corresponding to said synchronous speed, whereby resonance occurs in the circuit at or about full working speed of the motor, i. e., synchronous speed.

If the currents in the two phases are both plotted (Fig. 3) to the base of the ratio of torque divided by revs. per sec. (i. e., a measure of viscosity) the curve corresponding to the current in the condenser phase will be a damped resonance curve, the current diminishing with increase of the base values. The current measured in the direct phase provides a curve sloping in the opposite sense within the working range and is substantially a logarithmic curve, the current increasing with increase of the base values. The vertical OY corresponds to approximately synchronous speed or maximum resonance, with minimum current in the direct phase and maximum current in the condenser phase. The two curves are not completely symmetrical and thus the resultant change in the total current taken by the two phases together involves smaller changes with variation in viscosity than that in the direct phase alone. By measuring the current in the direct phase only a considerable magnification is obtained.

With the circuits shown it is possible by normal design methods to vary parts of the circuit such as the gap in the motor iron circuit and the resistance of the rotor strips or bars to ensure that the measured current is substantially proportional to the log. of the viscosity.

In a preferred modification, since the percentage change of viscosity per degree change in temperature is not exactly constant, but increases with increase of the viscosity of the liquid under test, the reading scale on the viscometer may be calibrated in a similar manner to R. E. F. U. T. A. S. paper to compensate for this change; in this the scale is a diminishing logarithmic one, each successive decrement being slightly larger than that on a log. log. scale.

In a modification the rectifiers 12 and 21 are replaced by thermal electric-convertors.

The milli-voltmeter may of course be replaced by a milli-ammeter or other suitable indicator.

The resistance bridge circuit shown may be replaced by a thermo-couple 25 (Fig. 2) whose potential is balanced against a predetermined but adjustable standard voltage, for example from a potentiometer 26 and battery 27, the two being in balance at the standard temperature, a switch 28 being provided to switch off the compensating current. Alternatively a thermistor may be utilised.

As a result of this arrangement, a viscometer is provided in which the indication given is always temperature-compensated, and viscosities can be compared, on a direct reading basis, at a common standard temperature.

We claim:

1. A viscometer comprising a two-phase electric motor adapted to be fed from a single phase supply, a reactance connected in the first phase of said motor of a value causing resonance to occur in that phase at approximately synchronous motor speed, drag means adapted to be located in a liquid under test, a driving connection between said motor and said drag means for rotating the latter in said liquid; whereby the current in the second phase is substantially proportional to the logarithm of the viscosity of the liquid, an electric indicating instrument, means feeding the current in the second phase of the motor to the indicating instrument, a substantially logarithmic scale on the indicating instrument the indication thus being direct reading and having constant percentage accuracy over the scale, resistance bridge means in which an arm is adapted to be located in the liquid under test being thereby subjected to variations of the temperature of the liquid and means for feeding the out of balance current from said bridge arising from change in temperature above and below a standard temperature to the indicating instrument along with the current of said second phase to said indicating instrument to compensate for variation in temperature from a standard value.

2. A viscometer in which the viscosity of a liquid under test is measured by a primary electric current, comprising a two-phase electric motor adapted to be fed from a single phase supply, a reactance connected in one phase of said motor of a value which causes resonance to occur in that phase at approximately synchronous motor speed, the current in the other phase providing said primary current, a drag member adapted to be rotated in the liquid under test by the electric motor, the primary current being a function of the electrical input to the motor, an electric resistance bridge circuit an arm of which is subjected to the same temperature change as the liquid under test, and a connection feeding the out of balance bridge current, arising from change in temperature above and below a standard temperature, to said primary current to compensate the measurement for variations in the temperature of the liquid from the standard temperature.

3. A viscometer as claimed in claim 2, in which the viscosity indicating scale is substantially logarithmic, whereby constant percentage accuracy is obtainable over the whole scale.

4. A viscometer as claimed in claim 3, in which the viscosity-indicating scale is a diminishing logarithmic one.

5. A viscometer as claimed in claim 2, in which means is provided for selecting the desired standard temperature relative to which compensation is effected.

6. A viscometer in which the viscosity of a liquid under test is measured by an electric primary current, comprising a two-phase electric motor adapted to be fed from a single phase supply, a reactance connected in one phase of said motor of a value which causes resonance to occur in that phase at approximately synchronous motor speed, the current in the other phase providing said primary current, a drag member adapted to be rotated in the liquid under test by the electric motor, the primary current being a function of the electrical input to the motor, an electrically energized compensating circuit having a conductive part, the current through which circuit is influenced by the temperature of said part, wherein said part is subjected to the same temperature change as the liquid under test, said compensating circuit including elements to provide a compensating current which is a function of the deviation of the measured viscosity from the viscosity of the liquid as it would be at a standard temperature, and a connection feeding the compensating current to said primary current giving a resultant current compensated for variations in the temperature of the liquid from the standard temperature.

7. A viscometer as claimed in claim 6, in which the compensating circuit includes a thermo-electric sensitive element influenced by the temperature of the liquid under test and balanced against a predetermined standard potential, out-of-balance current arising from the temperature change in the liquid being utilized for the compensating current.

References Cited in the file of this patent

UNITED STATES PATENTS 2,396,420   Hayward et al. _____ Mar. 12, 1946

FOREIGN PATENTS 899,057   France _____ July 24, 1944

OTHER REFERENCES

Journal of Scientific Instruments, February 1950, vol. 27; No. 2, pp. 41–43.